United States Patent
He

(10) Patent No.: US 11,927,572 B2
(45) Date of Patent: Mar. 12, 2024

(54) WATER REMOVAL METHOD FOR GAS CONCENTRATION SAMPLING, SAMPLING METHOD AND DEVICE THEREFOR

(71) Applicant: CHENGDU COLIN ANALYSIS TECHNOLOGY CO., LTD., Sichuan (CN)

(72) Inventor: Qifa He, Sichuan (CN)

(73) Assignee: CHENGDU COLIN ANALYSIS TECHNOLOGY CO., LTD., Sichuan (CN)

( * ) Notice: Subject to any disclaimer, the term of this patent is extended or adjusted under 35 U.S.C. 154(b) by 438 days.

(21) Appl. No.: 17/294,406

(22) PCT Filed: Dec. 2, 2019

(86) PCT No.: PCT/CN2019/122436
§ 371 (c)(1),
(2) Date: May 16, 2021

(87) PCT Pub. No.: WO2020/114354
PCT Pub. Date: Jun. 11, 2020

(65) Prior Publication Data
US 2022/0011277 A1 Jan. 13, 2022

(30) Foreign Application Priority Data
Dec. 5, 2018 (CN) .......................... 201811482661.7

(51) Int. Cl.
*G01N 30/12* (2006.01)
*G01N 1/40* (2006.01)
*G01N 30/02* (2006.01)

(52) U.S. Cl.
CPC ............... *G01N 30/12* (2013.01); *G01N 1/40* (2013.01); *G01N 2030/025* (2013.01); *G01N 2030/123* (2013.01); *G01N 2030/128* (2013.01)

(58) Field of Classification Search
CPC ............... G01N 1/40; G01N 2023/025; G01N 2030/123; G01N 2030/126; G01N 2030/128; G01N 30/12
See application file for complete search history.

(56) References Cited

U.S. PATENT DOCUMENTS

| 5,479,815 A | 1/1996 | White et al. |
| 8,939,011 B2 | 1/2015 | Li et al. |

(Continued)

FOREIGN PATENT DOCUMENTS

| CN | 102410986 A | 4/2012 |
| CN | 103499662 A | 1/2014 |

(Continued)

OTHER PUBLICATIONS

English translation of CN108226322 accessed from iq.ip.com Oct. 11, 2023.*

(Continued)

*Primary Examiner* — Kristina M Deherrera
*Assistant Examiner* — Jean F Morello
(74) *Attorney, Agent, or Firm* — Rivka Friedman

(57) ABSTRACT

A water removal method for gas concentration sampling, and a sampling method and device. The water removal method comprises: removing water from a sample gas by means of a first cold trap tube filled with a hydrophilic material, and then concentrating the sample gas by means of a concentration cold trap tube; then by means of a carrier gas, conveying components desorbed by the first cold trap tube under a heating state to a second cold trap tube that is (Continued)

in a cooled state and that is filled with a hydrophobic organic adsorbent material, and adsorbing organic substances in the components desorbed by the first cold trap tube: by means of the carrier gas, bringing the moisture desorbed by the first cold trap tube out of the second cold trap tube, and then by means of the carrier gas, conveying residual components desorbed by the first cold trap tube and the second cold trap tube under the heating state to the concentration cold trap tube for concentration.

8 Claims, 2 Drawing Sheets

(56) References Cited

U.S. PATENT DOCUMENTS

| | | | |
|---|---|---|---|
| 10,942,155 B1 * | 3/2021 | Bossard | G01N 30/66 |
| 11,067,548 B2 | 7/2021 | Cardin | |
| 2006/0137432 A1 | 6/2006 | Kin et al. | |

FOREIGN PATENT DOCUMENTS

| | | |
|---|---|---|
| CN | 203443939 U | 2/2014 |
| CN | 205786045 U | 12/2016 |
| CN | 108226322 A | 6/2018 |
| CN | 109358143 A | 2/2019 |
| EP | 2927680 A2 | 10/2015 |
| EP | 3176578 A1 | 6/2017 |
| JP | 1997222425 A | 8/1997 |
| JP | 1144685 A | 2/1999 |
| JP | 2000227425 A | 8/2000 |
| JP | 2001033362 A | 2/2001 |
| JP | 2009002711 A | 1/2009 |
| WO | 2013037182 A1 | 3/2013 |
| WO | 2017176794 A1 | 10/2017 |

OTHER PUBLICATIONS

The first office action issued by Indian Patent Office dated Feb. 25, 2022, for Chengdu Colin Analysis Technology Co., Ltd., India application No. 202147024015, filed on Dec. 2, 2019.

The first office action issued by Japan Patent Office dated Apr. 26, 2022, for Chengdu Colin Analysis Technology Co., Ltd., Japan application No. 2021-530054, filed on Dec. 2, 2019.

Extended European Search Report dated Nov. 28, 2022 From European Patent Office Re. Application No. EP19893429.1.

* cited by examiner

WATER REMOVAL METHOD FOR GAS CONCENTRATION SAMPLING, SAMPLING METHOD AND DEVICE THEREFOR

FIELD OF INVENTION

The present disclosure relates to the technical field of pretreatment concerning gas chromatographs, and in particular to a water removal method for gas concentration and sampling, a sample feeding method and a device therefor.

BACKGROUND OF DISCLOSURE

A gas chromatograph or gas-mass spectrometer is generally used to detect volatile and semi-volatile organic substances. Since using direct detection methods to detect organic substances with extremely low contents, especially organic substances that are volatile in the air, the sensitivities of detectors of common instruments hardly meet the requirements, enrichment and concentration are required, and then the enriched and concentrated samples are eluted to obtain high-concentration samples for analysis. Thermal desorption is a type of green sample feeding method by heating and eluting to-be-tested components concentrated in the adsorbent with inert gas, so as to enter the gas chromatograph. The thermal desorption has become more and more widely used. However, every aspect of its entire process affects the analysis results.

Gas sampling methods of the thermal desorption are generally divided into three types, including tube sampling, tank sampling, and online sampling. The traditional online sampling for the thermal desorption generally introduces a sample gas by means of a vacuum pump into a sample concentration cold trap tube for concentration and then for desorption in order to obtain a lower detection limit. Sample gases always contain moisture as a component, no matter which one of the above sampling methods is adopted. When moisture enters the instruments, the instruments are affected, causing extremely large deviations in the qualitative and quantitative tests of the components, and even damaging the instruments. Therefore, water removal is one of the necessary functions of the thermal desorption instruments.

The water removal methods of online sampling for thermal desorption mainly include water removal by organic membrane and water removal at low temperature. Wherein, in the water removal by organic membrane, the polar molecules (e.g. moisture) are introduced into the organic membrane tube, and pass through the membrane to reach an external dry environment in low-pressure atmosphere for achieving water removal while the non-polar molecules enter the concentration cold trap tube through a pipeline. The water removal at low temperature uses a tube made of special materials or a tube with water-absorbing materials. When the sample gas passes through the tube, moisture is captured, so that most of the to-be-tested components enter the concentration cold trap tube through the water removal tube.

SUMMARY OF INVENTION

Technical Problem

The above two water removal methods may both cause partial losses of some components, resulting in a low recovery rate. For example, water removal by organic membrane may cause partial losses of polar components that are similar to the polarity of water, and traditional water removal at low temperature may cause heavy components (such as ozone precursor ethylene, ethane to dodecane, etc. The higher the boiling point is, the easier the components remain in the water removal tube) to remain in the water removal tube, resulting in a low recovery rate.

Solutions to the Problems

Technical Solutions

The object of the present disclosure is to provide a water removal method for gas concentration and sampling and a sample feeding method therefor, which are able to reduce losses of components similar to the polarity of water and components with high boiling points during the processes of concentration and sampling.

A water removal method for gas concentration and sampling, wherein comprising the following steps of:

a: introducing a sample gas into a first cold trap tube filled with hydrophilic materials and being in a cooling state for water removal, and then introducing the sample gas after passing through the first cold trap tube into a concentration cold trap tube in a cooling state for concentration;

b: introducing a carrier gas into the first cold trap tube in a heating state, and conveying the organic substances and moisture both desorbed from the first cold trap tube by means of the carrier gas to a second cold trap tube filled with hydrophobic organic substance-adsorbing materials and being in a cooling state, for adsorbing the organic substances desorbed from the first cold trap tube and carrying the moisture desorbed from the first cold trap tube out of the second cold trap tube by means of the carrier gas;

c: introducing the carrier gas into the first cold trap tube and the second cold trap tube simultaneously in a heating state, and conveying the organic substances respectively desorbed from the first cold trap tube and the second cold trap tube by means of the carrier gas to the concentration cold trap tube in a cooling state for concentration.

According to a specific embodiment, in the water removal method for gas concentration and sampling of the present disclosure, the cooling state is at a temperature ranging from −10 ° C. to −50° C., and the heating state ranges from 100° C. to 300° C.

The present disclosure further provides a sample feeding method for gas concentration and sampling, wherein performing the water removal method of the present disclosure during the process of sample feeding to remove water; then introducing the carrier gas into the concentration cold trap tube in a desorption state, and conveying the organic substances desorbed from the concentration cold trap tube to an analytical instrument or a sampling tube by means of the carrier gas, whereby finishing the sampling and feeding of samples into the analytical instrument. Wherein, the desorption state is at a temperature correlating with the organic substances concentrated by the concentration cold trap tube.

The present disclosure further provides a water removal device for gas concentration and sampling, comprising a first cold trap, a second cold trap, a concentration cold trap and a control module; wherein, the first cold trap has a cold trap tube filled with hydrophilic materials therein;

the second cold trap has a cold trap tube filled with hydrophobic organic substance-adsorbing materials therein;

the control module includes three control modes; wherein, a first control mode is configured to control the first cold trap and the concentration cold trap to both operate in cooling states, and to control a controllable valve in a pipeline, so that a sample gas from a sample gas source passes through the cold trap tube of the first cold trap and a cold trap tube of the condensation cold trap successively and the sample gas successively undergoes water removal and condensation;

a second control mode is configured to control the first cold trap to operate in a heating state, to control the second cold trap to operate in a cooling state, and to control the controllable valve in the pipeline, so that a carrier gas from a carrier gas source passes through the cold trap tubes of the first cold trap and the second cold trap successively to adsorb organic substances desorbed from the cold trap tube of the first cold trap and to carry moisture desorbed from the cold trap tube of the first cold trap out of the cold trap tube of the second cold trap by means of the carrier gas;

a third control mode is configured to control the first cold trap and the second cold trap to both operate in heating states, and to control the controllable valve in the pipeline, so that the carrier gas from the carrier gas source passes through the cold trap tubes of the first cold trap and the second cold trap respectively, and then enters the cold trap tube of the concentration cold trap to concentrate the organic substances desorbed from the cold trap tubes of the first cold trap and the second cold trap.

According to a specific embodiment, in the water removal device for gas concentration and sampling of the present disclosure, the first cold trap, the second cold trap and the concentration cold trap are all provided with heating parts, cooling parts and temperature sensing elements; and the control module respectively controls power of the heating parts or the cooling parts according to temperature data detected by the temperature sensing elements of the first cold trap, the second cold trap and the concentration cold trap.

According to a specific embodiment, the water removal device for gas concentration and sampling of the present disclosure further comprises a pressure regulator configured to adjust pressure of the carrier gas introduced by the carrier gas source.

The present disclosure further provides a sample feeding device for gas concentration and sampling, wherein the control module is further provided with a fourth control mode therein on the basis of the water removal device for gas concentration and sampling of the present disclosure; wherein, the fourth control mode is configured to control the concentration cold trap to operate in a desorption state, and to control the controllable valve in the pipeline, so that the carrier gas from the carrier gas source is introduced into the cold trap tube of the concentration cold trap so as to convey organic substances desorbed from the cold trap tube of the concentration cold trap to an analytical instrument or a sampling tube, for fulfilling automatic control of gas concentration and sampling as well as the feeding of sample into the analytical instrument.

Beneficial Effects of the Invention

Beneficial Effect

The water removal method for gas concentration and sampling of the present disclosure includes removing water from the sample gas by means of the first cold trap tube filled with hydrophilic materials; then concentrating the sample gas after passing through the concentration cold trap tube; then conveying components desorbed from the first cold trap tube in a heating state by means of the carrier gas to the second cold trap tube filled with hydrophobic organic substance-adsorbing materials and being in a cooling state, for adsorbing the organic substances desorbed from the first cold trap tube as well as carrying the moisture desorbed from the first cold trap tube out of the second cold trap tube by means of the carrier gas; and then conveying the organic substances respectively desorbed from the first cold trap tube and the second cold trap tube both in heating states by means of the carrier gas to the concentration cold trap tube for concentration. Therefore, the present disclosure is able to reduce losses of components that are similar to the polarity of water as well as of components with high boiling points for raising the recovery rate.

BRIEF DESCRIPTION OF DRAWINGS

Description of the Drawings

Figure 1:
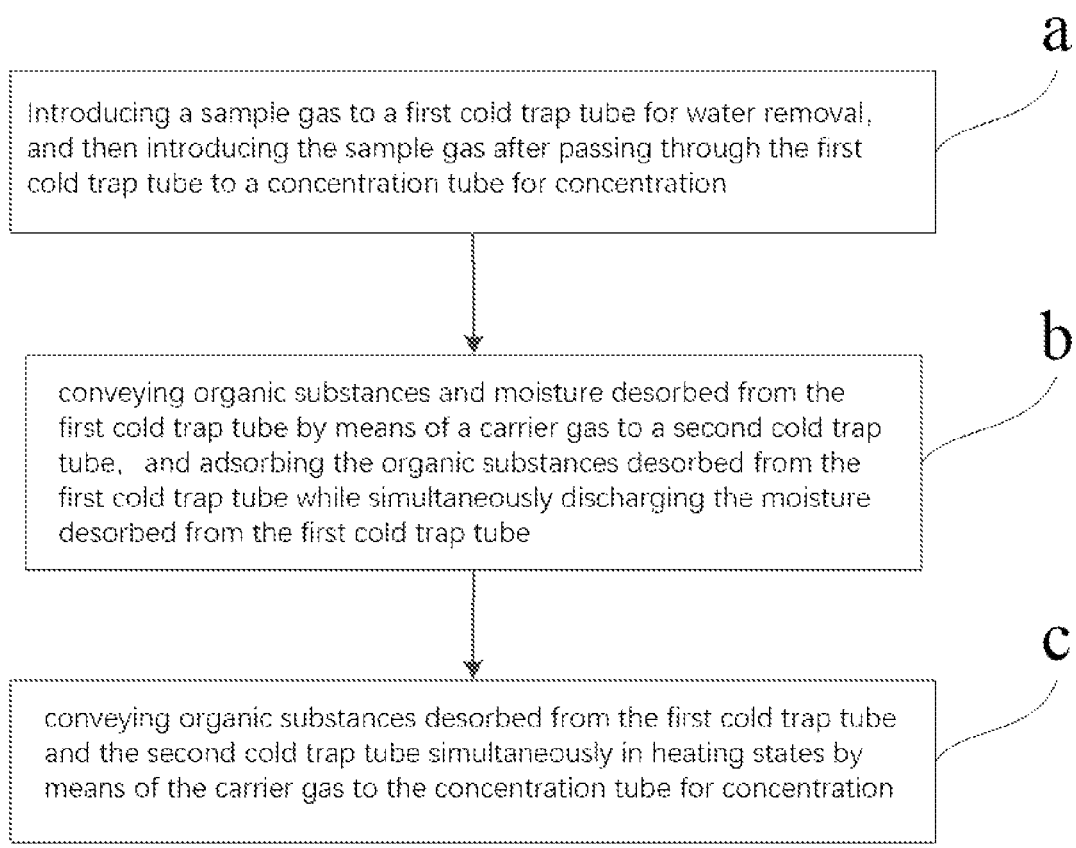

FIG. 1 is a flow chart of the water removal method for gas concentration and sampling according to the present disclosure.

Figure 2:
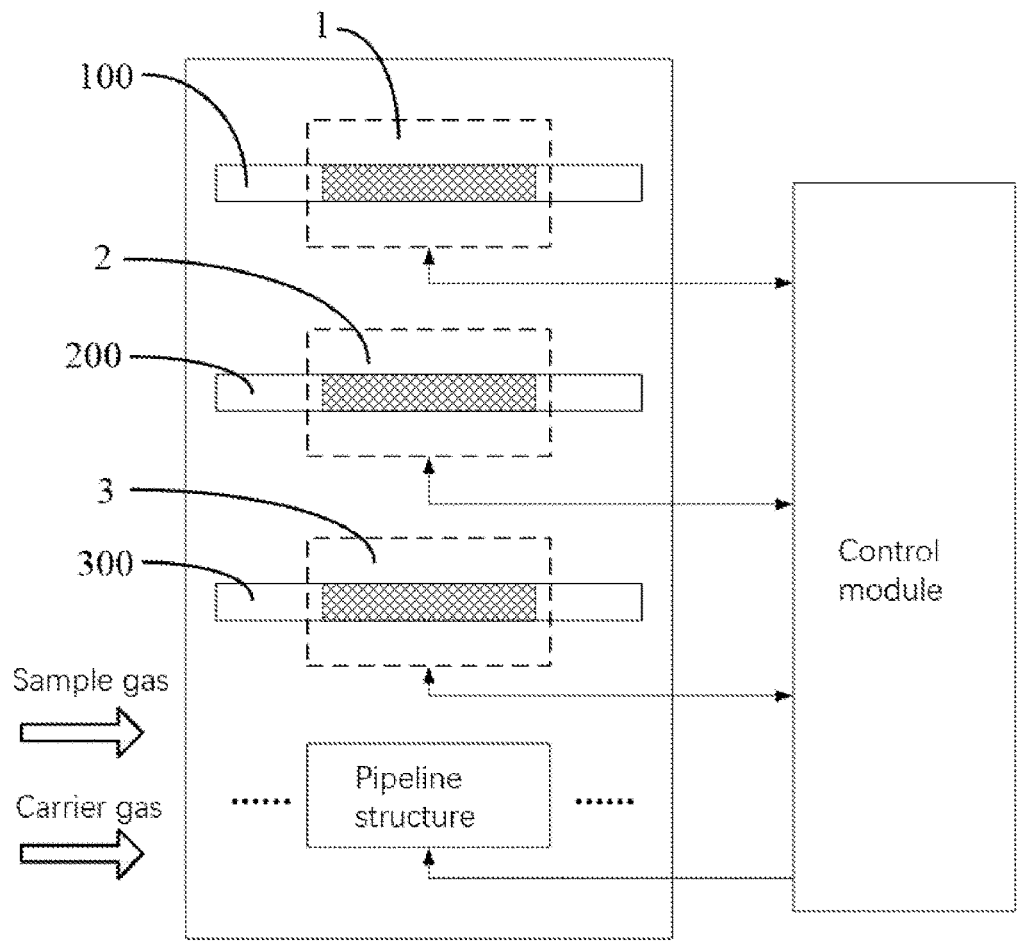

FIG. 2 is a schematic diagram of the structure of the water removal device for gas concentration and sampling according to the present disclosure.

Figure 3:
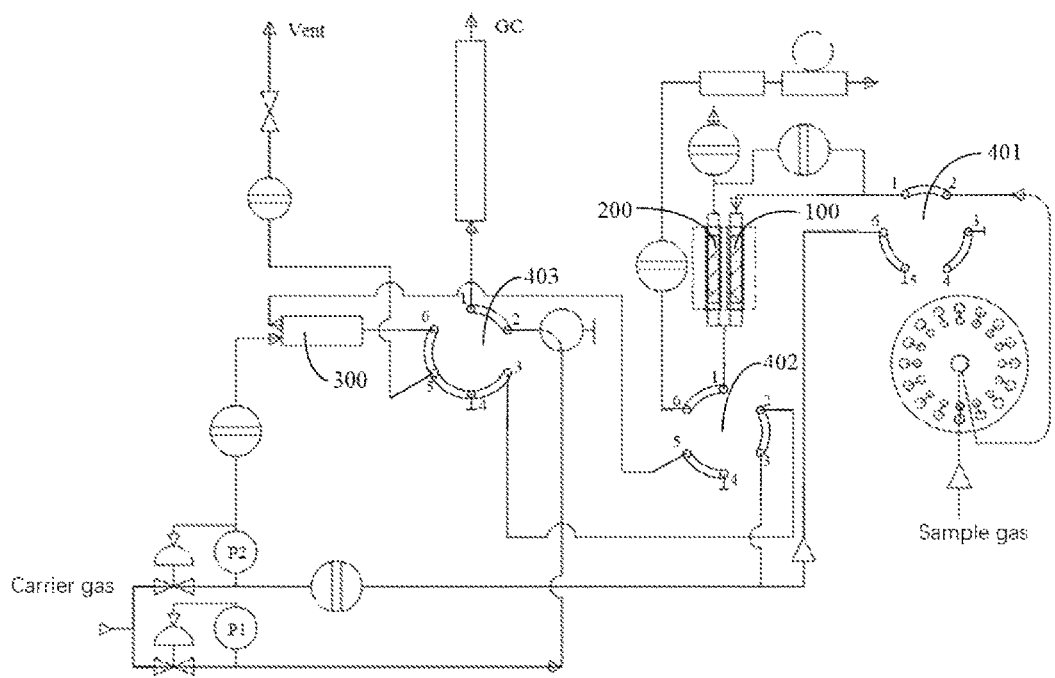

FIG. 3 is a schematic diagram of a pipeline connection of the sample feeding device for gas concentration and sampling according to the present disclosure.

DETAILED DESCRIPTION OF PREFERRED EMBODIMENTS

Examples of the Invention

Embodiments of the Present Disclosure

The present disclosure is further described in detail below with reference to trial examples and specific embodiments. However, it should not be understood that the scope of the aforementioned subject matter of the present disclosure is limited to the following embodiments, and thus all the techniques that are carried out on the basis of the content of the present disclosure belong to the scope of the present disclosure.

FIG. 1 illustrates the water removal method for gas concentration and sampling according to the present disclosure, comprising the following steps:

a: introducing a sample gas into a first cold trap tube filled with hydrophilic materials and being in a cooling state for water removal, and then introducing the sample gas after passing through the first cold trap tube into a concentration cold trap tube in a cooling state for concentration. Specifically, the first cold trap tube is filled with hydrophilic materials, especially with hydrophilic materials having a weak ability to adsorb organic substances, such as glass wool.

b: introducing a carrier gas into the first cold trap tube in a heating state, and conveying components desorbed from the first cold trap tube by means of the carrier gas to a second cold trap tube filled with hydrophobic organic substance-adsorbing materials and being in a cooling state, for adsorbing the organic substances desorbed from the first cold trap tube as well as carrying the moisture desorbed from the first cold trap tube out of the second cold trap tube by means of the carrier gas. Specifically, the second cold trap tube is filled with hydrophobic organic substance-adsorbing materials, such as Tenax.

c: introducing the carrier gas into the first cold trap tube and the second cold trap tube simultaneously in heating states, and conveying the organic substances respectively desorbed from the first cold trap tube and the second cold trap tube by means of the carrier gas to the concentration cold trap tube in a cooling state for concentration. Wherein, the materials filled inside the concentration cold trap tube correlates with the to-be-concentrated components and may be selected by the persons skilled in the art according to their specific needs.

Moreover, in the water removal method of the present disclosure for gas concentration and sampling, the temperature of the first cold trap tube and the second cold trap tube ranges from −10° C. to −50° C. in a cooling state and from 100° C. to 300° C. in a heating state and may be further selected by the persons skilled in the art according to different application scenarios.

The present disclosure also provides a sample feeding method for gas concentration and sampling, wherein after completing water removal by utilizing the water removal method for gas concentration and sampling of the present disclosure during the sample feeding process, desorbing the components concentrated in the concentration cold trap tube, that is, heating the concentration cold trap tube to a desorption temperature, and introducing the carrier gas into the concentration cold trap tube, for conveying the organic substances desorbed from the concentration cold trap tube to an analytical instrument or a sampling tube via the carrier gas. Wherein, the concentration cold trap tube in the desorption state is at a temperature that correlates with properties of the organic substances concentrated thereby.

FIG. 2 illustrates a water removal device for gas concentration and sampling, comprising a first cold trap 1, a second cold trap 2, a concentration cold trap 3 and a control module. Wherein, the first cold trap tube 100 is filled with hydrophilic materials, and the second cold trap tube 200 is filled with a hydrophobic organic substance-adsorbing material. The concentration cold trap 3 has a concentration cold trap tube 300.

The control module includes three control modes, wherein:

The first control mode is configured to control the first cold trap 1 and the concentration cold trap 3 to both operate in cooling states, and to control a controllable valve in a pipeline, so that a sample gas from a sample gas source passes through the first cold trap tube 100 and the condensation cold trap tube 300 successively, so that the sample gas successively undergoes water removal and condensation.

The second control mode is configured to control the first cold trap 1 to operate in a heating state, to control the second cold trap 2 to operate in a cooling state, and to control the controllable valve in the pipeline, so that a carrier gas from a carrier gas source passes through the first cold trap tube 100 and the second cold trap tube 200 successively. The second cold trap tube 200 is filled with hydrophobic organic substance-adsorbing materials for adsorption of organic substances desorbed from the first cold trap tube 100 and at the same time, the carrier gas carries the moisture desorbed from the first cold trap tube 100 out of the second cold trap tube.

The third control mode is configured to control the first cold trap 1 and the second cold trap 2 to both operate in heating states and the concentration cold trap 3 in a cooling state, and to control the controllable valve in the pipeline, so that the carrier gas from the carrier gas source passes through the first cold trap tube 100 and the second cold trap tube 200 respectively, and then enters the concentration cold trap tube 300 to concentrate the organic substances desorbed from the first cold trap tube 100 and the second cold trap tube 200.

Specifically, the first cold trap 1, the second cold trap 2 and the concentration cold trap 3 are all provided with heating parts, cooling parts and temperature sensing elements; and the control module respectively controls power of the heating parts or the cooling parts according to temperature data detected by the temperature sensing elements of the first cold trap, the second cold trap and the concentration cold trap. When in operation, a pressure regulator can be provided in the input pipeline of the carrier gas source, which is configured to adjust pressure of the carrier gas introduced by the carrier gas source, and the pressure regulator can also be controlled by the control module.

In the water removal device for gas concentration and sampling of the present disclosure, the specific pipeline structure may be constituted by connecting a certain number of pipelines and controllable valves. Moreover, those skilled in the art is able to determine the specific connection relationships between the pipeline structure and the first cold trap tube, the second cold trap tube, the concentration cold trap tube, the sample gas source as well as the carrier gas source according to the gas path relationships corresponding to each control modes of the control module. For example, the controllable valve can be selected from a three-way valve, a six-way valve, a switching valve and on-off valve, etc. that are common on the market respectively, which would not be repeated herein.

In addition, the water removal device for gas concentration and sampling of the present disclosure can also be configured as a sample feeding device for gas concentration and sampling, that is, directly using the control function of the control module to dispose the fourth control mode in the control module, and the fourth control mode is configured to control the concentration cold trap 3 to operate in the desorption state, and to control the controllable valve in the pipeline, so that the carrier gas from the carrier gas source is introduced into the concentration cold trap tube 300, for conveying the organic substances desorbed from the cold trap tube of the concentration cold trap to an analytical instrument or a sampling tube, so as to realize the gas concentration and sampling as well as automatic control of the sample feeding of the analytical instrument.

The control module of the present disclosure is an appliance having functions of switch signals output and analog signals acquisition, such as integrated components and parts including a PLC controller or a single-chip microcomputer that are common on the market, etc.

FIG. 3 illustrates a schematic diagram of a pipeline connection of the device for gas concentration and sampling of the present disclosure, but the control module is not shown therein. The working principle of the device for gas concentration and sampling is specified as follows:

The carrier gas undergoes two-route pressure adjustments respectively to obtain two carrier gases with different pressure outputs. Wherein, the carrier gas with an output pressure of P1 is connected to the second port of the switching valve 403 through a three-way switch valve, and then is exported through the first port of the switching valve 403 to provide the carrier gas for the transmission line. The carrier gas with an output pressure of P2 passes through a switch valve to reach the third port of the switching valve 402, whose second port is connected to the third port of the switching valve 403. Since the third to sixth ports of the switching valve 403 are interconnected and the sixth port of the switching valve 403 is connected to one end of the concentration cold trap tube 300, and moreover, the carrier gas with an output pressure of P2 is connected to the other end of the concentration cold trap tube 300 through a switch valve, so as to provide the carrier gas for the desorption and sample feeding of the concentration cold trap tube 300.

The sample gas is exported to second port of a six-way valve 401 through a multi-way selector valve, and then enters one end of the first cold trap tube 100 through the first port of the six-way valve 401. The sample gas passes through the first cold trap tube 100; then through the first and second ports of the switching valve 402 and the third to sixth ports of the switching valve 403 to reach the concentration cold trap tube 300; through the concentration cold trap tube 300; and then through the fifth and sixth ports of the switching valve 402, a switch valve and a flow controller to reach the pump. Since the first cold trap tube 100 is in an adsorption state at a low-temperature of −30° C. and is filled with hydrophilic materials to adsorb the moisture in the sample gas, and at the same time, the concentration cold trap tube 300 is also in an adsorption state at a low-temperature of −30° C., therefore the concentration cold trap tube 300 concentrates the sample gas.

Then, the carrier gas with an output pressure of P2 is exported to the first cold trap tube 100 through the sixth port and the first port of the switching valve 401. The carrier gas passes through the first cold trap tube 100, then enters the second cold trap tube 200, and is then discharged from the other end of the second cold trap tube 200. During this process, since the first cold trap tube 100 operates in the heating state at a temperature of 300° C. and the second cold trap tube 200 in the adsorption state at a low temperature of −30° C., the carrier gas conveys the components desorbed from the first cold trap tube 100 to the second cold trap tube 200. Since the hydrophobic organic substance-adsorbing materials filled in the second cold trap tube 200 is able to adsorb the organic substances desorbed from the first cold trap tube 100, and at the same time, the carrier gas carries the moisture desorbed from the first cold trap tube 100 out of the second cold trap tube 200, the water removal process is thus completed.

Then, the carrier gas with an output pressure of P2 is exported to the first cold trap tube 100 and the second cold trap tube 200 through the sixth port and the first port of the switching valve 401 respectively, wherein the first cold trap tube 100 and the second cold trap tube 200 are jointly connected to the first port of the switching valve 402; then passes through the second port of the switching valve 402 as well as the third to sixth ports of the switching valve 403 to reach the concentration cold trap tube 300; after passing through the concentration cold trap tube 300, and then passes through the fifth and sixth port of the switching valve 402, an on-off valve and a flow controller to reach the pump. During this process, since the first cold trap tube 100 and the second cold trap tube 200 are both controlled to operate in the heating states and the concentration cold trap 3 is controlled to operate in the adsorption state at a low-temperature of −30° C., the carrier gas is able to convey the organic substances desorbed from the first cold trap tube 100 and the second cold trap tube 200 to the concentration cold trap tube 300 for concentration.

Moreover, after the completion of the process of water removal for gas concentration and sampling, the concentrated components further need to be sent to the analytical instrument or the sample tube. The carrier gas with an output pressure of P2 passes through the concentration cold trap tube 300, and after passing through the concentration cold trap tube 300, then passes through the sixth port and the first port of the switching valve 403 to the analytical instrument or the sample tube. In addition, when the concentrated sample reaches an excessively high concentration, flow of high-concentration samples can split because the fifth port of the switching valve 403 are further connected to an on-off valve and a flow control valve.

What is claimed is:

1. A water removal method for gas concentration and sampling, wherein comprising the following steps of:
   a: introducing a sample gas into a first cold trap tube filled with hydrophilic materials and being in a cooling state for water removal, and then introducing the sample gas after passing through the first cold trap tube into a concentration cold trap tube in a cooling state for concentration;
   b: introducing a carrier gas into the first cold trap tube in a heating state;conveying organic substances and moisture both desorbed from the first cold trap tube by means of the carrier gas to a second cold trap tube filled with hydrophobic organic substance-adsorbing materials and being in a cooling state, for adsorbing the organic substances desorbed from the first cold trap tube;and carrying the moisture desorbed from the first cold trap tube out of the second cold trap tube by means of the carrier gas;
   c: introducing additional carrier gas into the first cold trap tube and the second cold trap tube which are simultaneously in a heating state, and conveying the organic substances respectively desorbed from the first cold trap tube and the second cold trap tube by means of the carrier gas to the concentration cold trap tube in a cooling state for concentration.

2. The water removal method for gas concentration and sampling according to claim 1, wherein the cooling state is at a temperature ranging from −10° C. to −50° C., and the heating state ranges from 100° C. to 300° C.

3. A sample feeding method for gas concentration and sampling, wherein after removing water by means of the water removal method for gas concentration and sampling according to claim 1, then introducing the carrier gas into the concentration cold trap tube in a desorption state, and conveying the organic substances desorbed from the concentration cold trap tube to an analytical instrument or a sampling tube by means of the carrier gas.

4. The sample feeding method for gas concentration and sampling according to claim 3, wherein the desorption state is at a temperature correlating with the organic substances concentrated by the concentration cold trap tube.

5. A water removal device for gas concentration and sampling, comprising a first cold trap, a second cold trap, a concentration cold trap and a control module; wherein
   the first cold trap has a cold trap tube filled with hydrophilic materials therein;
   the second cold trap has a cold trap tube filled with hydrophobic organic substance-adsorbing materials therein;
   the control module includes three control modes; wherein a first control mode is configured to control the first cold trap and the concentration cold trap to both operate in cooling states, and to control a controllable valve in a pipeline, so that a sample gas from a sample gas source passes through the cold trap tube of the first cold trap and a cold trap tube of the condensation cold trap successively, and the sample gas successively undergoes water removal and condensation;

a second control mode is configured to control the first cold trap to operate in a heating state, to control the second cold trap to operate in a cooling state, and to control the controllable valve in the pipeline, so that a carrier gas from a carrier gas source passes through the cold trap tubes of the first cold trap and the second cold trap successively to adsorb organic substances desorbed from the cold trap tube of the first cold trap and to carry moisture desorbed from the cold trap tube of the first cold trap out of the cold trap tube of the second cold trap by means of the carrier gas;

a third control mode is configured to control the first cold trap and the second cold trap to both operate in heating states, and to control the controllable valve in the pipeline, so that the carrier gas from the carrier gas source passes through the cold trap tubes of the first cold trap and the second cold trap respectively, and then enters the cold trap tube of the concentration cold trap to concentrate the organic substances desorbed from the cold trap tubes of the first cold trap and the second cold trap.

6. The water removal device for gas concentration and sampling according to claim 5, wherein the first cold trap, the second cold trap and the concentration cold trap are all provided with heating parts, cooling parts and temperature sensing elements;and the control module respectively controls power of the heating parts or the cooling parts of the first cold trap, the second cold trap and the concentration cold trap according to temperature data detected by the temperature sensing elements of the first cold trap, the second cold trap and the concentration cold trap.

7. The water removal device for gas concentration and sampling according to claim 5, further comprising a pressure regulator configured to adjust pressure of the carrier gas introduced by the carrier gas source.

8. A sample feeding device for gas concentration and sampling, comprising the water removal device for gas concentration and sampling according to claim 5; wherein the control module further includes a fourth control mode; wherein the fourth control mode is configured to control the concentration cold trap to operate in a desorption state, and to control the controllable valve in the pipeline, so that the carrier gas from the carrier gas source is introduced into the cold trap tube of the concentration cold trap, for conveying the organic substances desorbed from the cold trap tube of the concentration cold trap to an analytical instrument or a sampling tube.

* * * * *